United States Patent [19]

Kawabata

[11] 3,996,955
[45] Dec. 14, 1976

[54] VACUUM SUPPLY VALVE

[75] Inventor: Yasuhiro Kawabata, Toyota, Japan

[73] Assignee: Aisin Seiki Kabushiki Kaisha, Toyota, Japan

[22] Filed: Oct. 29, 1974

[21] Appl. No.: 519,022

[30] Foreign Application Priority Data

Nov. 16, 1973 Japan .............................. 48-129605

[52] U.S. Cl. .............................. 137/116.5; 137/85; 123/117 A
[51] Int. Cl.² .......................................... G05D 11/03
[58] Field of Search ....... 137/116.5, 627.5, DIG. 8, 137/85; 123/117 A

[56] References Cited

UNITED STATES PATENTS

| | | | |
|---|---|---|---|
| 2,806,481 | 9/1957 | Faust | 137/116.5 |
| 2,825,361 | 3/1958 | Seljos | 137/85 |
| 2,974,674 | 3/1961 | Baldridge | 137/85 |
| 3,088,485 | 5/1963 | Hanssen | 137/85 |
| 3,375,843 | 4/1968 | Buratti | 137/85 |
| 3,511,260 | 5/1970 | Benjamin | 123/117 A |

*Primary Examiner*—William R. Cline
*Assistant Examiner*—H. Jay Spiegel
*Attorney, Agent, or Firm*—Pierce, Scheffler & Parker

[57] ABSTRACT

A control valve for delaying the supply of vacuum pressure from an advance port of a carburetor to the distributor of a vehicle when said vehicle is started and/or accelerated.

4 Claims, 2 Drawing Figures

VACUUM SUPPLY VALVE

BACKGROUND OF THE INVENTION

1. Field of the Invention

The present invention relates generally to a vacuum supply valve, and more particularly for controlling the vacuum supply valve to a vacuum to a distributor for a vehicle engine.

2. Description of the Prior Art

It is well known that the quantity of the nitrogenous oxide in the exhaust gas of a vehicle engine is largest during acceleration of the vehicle. Conventionally, an electronic apparatus is provided by which the supply from vacuum of an advance port of carburetor to a vacuum control apparatus of a distributor of a vehicle engine can be stopped during acceleration of the vehicle. However, the cost of such electronic apparatus is expensive.

SUMMARY OF THE INVENTION

It is therefore an object of the present invention to provide an improved vacuum supply valve for obviating the above conventional drawback.

Another object of the present invention is to provide an improved vacuum supply valve which is new and low in cost.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
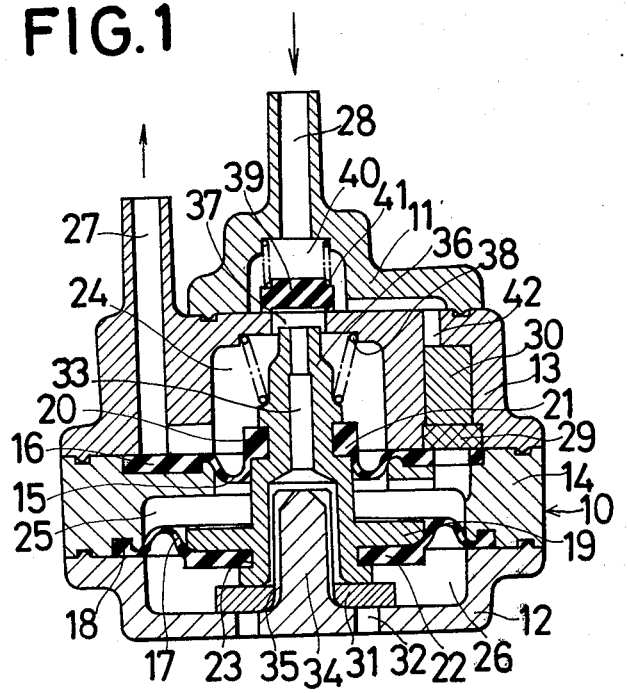
FIG. 1 is a sectional view of a vacuum control valve according to the invention.

Referring now to the drawings, and more particularly to FIG. 1 thereof, the reference numeral 10 denotes a vacuum supply valve comprising with an upper casing 11, a lower casing 12, an intermediate casing 13 located between the upper casing 11 and the lower casing 12, and a tubular casing 14 located between the intermediate casing 13 and the lower casing 12.

A small diaphragm 15 is fixed between the intermediate casing 13 and the tubular casing 14 at the outer portion 16 thereof. A large diaphragm 17 is fixed between the tubular casing 14 and the lower casing 12 at the outer portion 18 thereof. A floating valve 19 is provided in the casings 12, 13, 14. The inner portion 20 of the small diaphragm 15 is sealingly and fixedly inserted in an outer peripheral groove 21 of the floating valve 19 and the inner portion 22 of the large diaphragm 17 is sealingly and fixedly inserted in an outer peripheral groove 23 of the floating valve 19. A chamber 24 is formed within the intermediate casing 13 and a chamber 25 is formed within the tubular casing 14 and an atmospheric chamber 26 is formed within the lower casing 12. The chamber 24 always communicates with an outlet port 27 formed in the intermediate casing 13 and the chamber 25 always communicates with an inlet port 28 through a sintering orifice 29, a filter 30 fixed within the intermediate casing 13, and hole 42 in the casing 13, as shown. The atmospheric chamber 26 always communicated with the atmospheric air via an air filter 31 and a hole 32 formed in the lower casing 12. The inlet port 28 communicates with an advance port of a carburetor of an engine, not shown, and the outlet port 27 communicates with a vacuum control apparatus of a distributor of the engine, not shown.

An axial passage 33 is provided in the floating valve 19 for directing the atmospheric air within the atmospheric chamber 26 into the chamber 24. A guide portion 34 of the lower casing 12 is disposed in the axial passage 33 of the floating valve 19 so that inclination and radial movement of the floating valve 19 is controlled thereby. An axial groove 35 is provided on the outer periphery of the guide portion 34. An upper end portion 36 of the floating valve 19 is movable within a hole 37 formed in the intermediate casing 13. Thus when the floating valve 19 is moved upwardly against the force of a spring 38 disposed within the chamber 24, the upper end portion 36 of the floating valve 19 is seated on a poppet valve 39 provided in a chamber 40 of the upper casing 11 and the axial passage 33 in the floating valve 19 is closed, and when the poppet valve 39 is raised against the force of spring 41 disposed within the chamber 40 the chamber 24 communicates directly with the inlet port 28 through the hole 37.

The operation of the invention will now be described hereinbelow in detail.

The vacuum pressure supplied from the advance port of the carburetor, not shown, to the inlet port 28 of the vacuum supply valve 10 is transmitted into the chamber 25 through the chamber 40, the hole 42, the filter 30 and the sintering orifice 29, so that there is a pressure difference between the chamber 25 and the chamber 26 (atmospheric) and the floating valve 19 is urged upwardly by the pressure in the chamber 26 acting on the large diaphragm 17, while the pressure difference between the chamber 24 and the chamber 25 also acts on the floating valve 19 through the small diaphragm 15. However, the effective area of the large diaphragm 17 is greater than that of the small diaphragm 15, so that the upward urging force has a value which is the difference of the effective areas of the two diaphragms 15, 17 and the vacuum pressure of the chamber 25 also acts directly upwardly on the floating valve 19. Therefore, the floating valve 19 is moved upwardly according to the vacuum pressure within the chamber 25, and when the vacuum pressure within the chamber 25 attains a predetermined value, the end portion 36 of the floating valve 19 is seated on the poppet valve 39 and the passage 33 of the floating valve 19 is closed, whereby, the chamber 24 and the chamber 26 are closed. When the vacuum within the chamber 25 exceeds the predetermined value, the poppet valve 39 is raised by the floating valve 19 and the chamber 24 communicates directly with the inlet port 28 through the hole 37 and the chamber 40.

Figure 2:
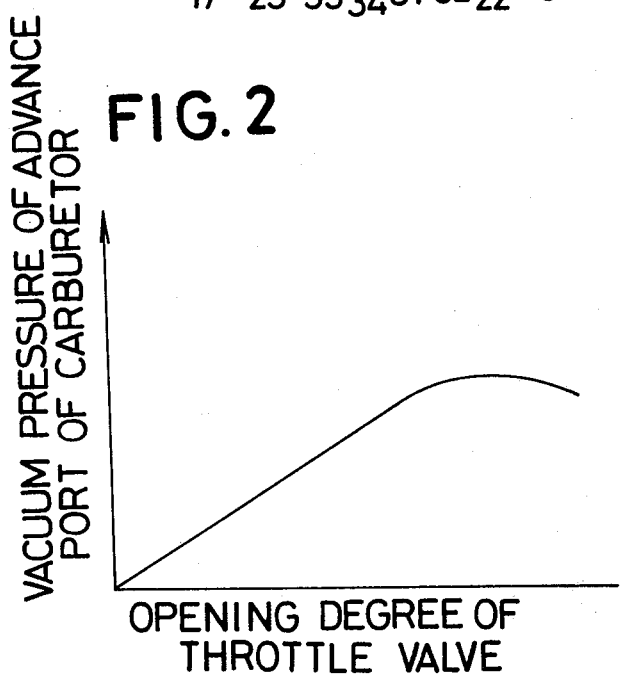
FIG. 2 shows the actuating state of the vacuum control valve when a vehicle is driven along a road.
Figure 2:
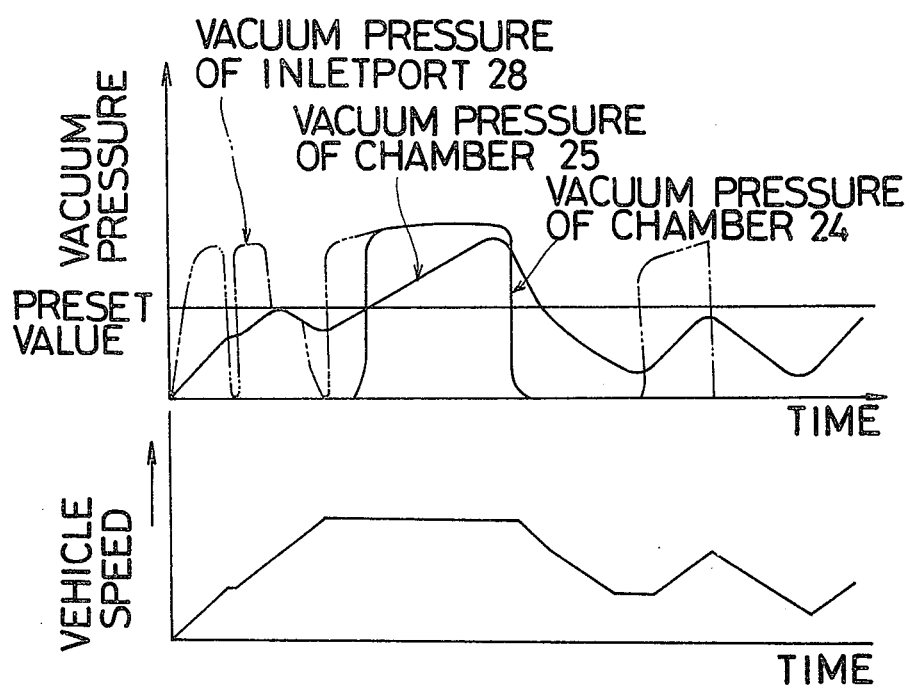

At starting and during acceleration of the vehicle, the vacuum pressure of the inlet port 28 is suddenly increased above the predetermined value, but since the chamber 25 communicates with the inlet port 28 through the sintering orifice 29, the filter 30, the hole 42 and the chamber 40, the vacuum pressure of the chamber 25 does not immediately respond to the increased vacuum pressure at the inlet port 28 and the vacuum pressure of the chamber 25 remains below the predetermined value for a while, during which atmospheric air is transmitted into the chamber 24 through chamber 26 and passage 33 and the actuation of the vacuum supply apparatus 10 is delayed. After a while the vacuum pressure in the chamber 25 increases above the predetermined value and the end portion 36 of the floating valve 19 is seated on the poppet valve 39, and the chamber 24 and the chamber 26 are closed and the poppet valve 39 is then upwardly moved by the floating valve 19 so that the chamber 24 communicates directly with the inlet port 28 through the hole 37 and the chamber 40, whereby the vacuum pressure at the advance port of the carburetor, not shown, is transmitted through the vacuum supply apparatus 10 to the distributor, not shown. When starting and stopping the vehicle is frequently repeated, the vacuum pressure of the chamber 25 does not reach the predetermined value and the vacuum supply apparatus 10 does not operate as shown in FIG. 2.

Obviously, many modifications and variations of the present invention are possible in light of the above teachings It is to be understood therefore that within the scope of the appended claims the present invention may be practiced otherwise than as specifically described herein.

What is claimed is:

1. A vacuum supply valve interposed between a carburetor and a vacuum control apparatus for a distributor of a vehicle engine, comprising:
    a housing provided with an inlet port connected to an advance port of the vehicle carburetor and an outlet port connected to the vacuum control apparatus for the vehicle distributor;
    a first chamber formed within said housing and communicating with said inlet port;
    a second chamber formed within said housing and communicating with said outlet port;
    an orifice means;
    a third chamber formed within said housing and communicating with said first chamber through said orifice means;
    a fourth chamber formed within said housing and communicating with the atmosphere;
    a poppet valve means disposed within said first chamber for selectively establishing communication between said first chamber and said second chamber;
    a first diaphragm disposed between and responsive to the pressures within said second chamber and said third chamber and secured about its periphery to said housing;
    a second diaphragm disposed between and responsive to the pressures within said third chamber and said fourth chamber and having a larger effective area than said first diaphragm and secured about its periphery to said housing, and
    a floating valve means slidably disposed within said second, third and fourth chambers and sealingly fixed to central portions of said first and second diaphragms for actuation thereby, said floating valve means being provided with an inner passage for normally communicating atmospheric air from said fourth chamber to said second chamber, and being reciprocable in response to variations in pressure in said third chamber for actuating said poppet valve means;
    whereby when the vacuum pressure within said third chamber attains a predetermined value said diaphragms actuate said floating valve means so that said inner passage in said floating valve means is closed by engagement with said poppet valve means to close communication between said second and said fourth chambers and when the vacuum pressure within the third chamber exceeds the predetermined value said poppet valve means is opened by further movement of said floating valve means to establish communication between said first and second chambers.

2. A vacuum supply valve as claimed in claim 1 and further comprising a filter interposed between said first chamber and said orifice means.

3. A vacuum supply valve as claimed in claim 1 and further comprising first spring means disposed within said first chamber for normally urging said poppet valve means to close communication between said first and second chambers.

4. A vacuum supply valve as claimed in claim 3 and further comprising second spring means disposed within said second chamber for normally urging said floating valve means into a position spaced from said poppet valve means.

* * * * *